United States Patent [19]

Sprague

[11] Patent Number: 4,478,483
[45] Date of Patent: Oct. 23, 1984

[54] VARIABLE LENGTH ELECTRO-OPTIC WAVEGUIDES AND APPLICATIONS THEREFOR

[75] Inventor: Robert A. Sprague, Saratoga, Calif.

[73] Assignee: Xerox Corporation, Stamford, Conn.

[21] Appl. No.: 376,910

[22] Filed: May 10, 1982

[51] Int. Cl.³ .............................................. G02B 5/174
[52] U.S. Cl. ................................ 350/96.14; 350/96.12; 365/215
[58] Field of Search ............... 350/96.12, 96.13, 96.14; 365/215, 234, 106

[56] References Cited

U.S. PATENT DOCUMENTS 3,795,433  3/1974  Channin ........................... 350/96.14
4,281,904  8/1981  Spargue et al. ..................... 350/356
4,415,226  11/1983  Verber et al. ..................... 350/96.14

*Primary Examiner*—John D. Lee
*Assistant Examiner*—Akm E. Ullah

[57] ABSTRACT

A variable length electro-optic waveguide is used to adjust the input conjugate of a focusing lens, thereby providing a relatively high speed and inexpensive focus control device having a wide dynamic control range for optical memories and the like. A pair of segmented electrodes are deposited in spaced apart relationship on or near a surface of an electro-optic element, and provision is made for individually addressing the electrode segments, whereby the effective length of the waveguide may be increased or decreased by increasing or decreasing, respectively, the number of adjacent electrode segments that are being actively driven at any given time. In keeping with one of the more detailed features of this invention, a multi-layer electrode construction is preferred so that the electrode segments may be interleaved in stacked, overlapping relationship to create a substantially continuous waveguide of controllable length.

12 Claims, 4 Drawing Figures

VARIABLE LENGTH ELECTRO-OPTIC WAVEGUIDES AND APPLICATIONS THEREFOR

FIELD OF THE INVENTION

This invention relates to variable length electro-optic waveguides and, more particularly, to electro-optic focus/tracking control devices for optical memories and the like.

BACKGROUND OF THE INVENTION

Substantial effort and expense have been devoted to the development of reliable focus and tracking control devices for optical data storage systems, such as optical disk memories. One of the more promising focus control techniques relies on a servo controlled voice coil motor to move a focusing lens forward and back relative to an optical recording medium as necessary to maintain a light beam in sharp focus on the optically sensitive surface (i.e., the information bearing surface) of the recording medium. Tracking, on the other hand, is conventionally performed by a servo controlled galvanometer which causes the focused beam to follow a preselected data track. Unfortunately, such electromechanical focus control and tracking devices tend to be somewhat sluggish because of mechanical inertia. Moreover, voice coil driven focusing lenses are quite expensive.

As is known, an optical waveguide may be created by coupling electric fields into an electro-optic element, thereby locally increasing the refractive index of the electro-optic element to produce a waveguiding region therein. See, U.S. Pat. No. 3,795,433, which issued Mar. 5, 1974 on "Voltage Induced Optical Waveguide Means."

SUMMARY OF THE INVENTION

In accordance with the present invention, a relatively high speed focus control device having a wide dynamic control range is provided for optical memories and the like by using a variable length electro-optic waveguide to adjust the input conjugate of a focusing lens. A pair of segmented electrodes are deposited in spaced apart relationship on or near a surface of an electro-optic element, and provision is made for individually addressing the electrode segments, whereby the effective length of the waveguide may be increased or decreased by increasing or decreasing, respectively, the number of adjacent electrode segments that are being actively driven at any given time. In keeping with one of the more detailed features of this invention, a multi-layer electrode construction is preferred so that the electrode segments may be interleaved in stacked, overlapping relationship to create a substantially continuous waveguide of controllable length.

In operation, a light beam for, say, reading optically recorded data is coupled into one end of the electro-optic element, and appropriate drive voltages are applied to all electrode segments between that end and a preselected spatial position along the length of the electro-optic element, so that the light beam is guided until it reaches that point. Since all of the electrode segments beyond that point are maintained at a common potential, such as ground, the light beam becomes unguided and diverges from an apparent or virtual point source essentially at the selected point. Such a focus control technique may be applied, if desired, to a laterally branching waveguide so that the beam may be simultaneously steered for, say, data tracking.

BRIEF DESCRIPTION OF THE DRAWINGS

Still further aspects and advantages of this invention will become apparent when the following detailed description is read in conjunction with the attached drawings, in which.

DETAILED DESCRIPTION OF THE ILLUSTRATED EMBODIMENTS

While the invention is described in some detail hereinbelow with reference to certain illustrated embodiments, it is to be understood that there is no intent to limit it to those embodiments. On the contrary, the aim is to cover all modifications, alternatives and equivalents falling within the spirit and scope of the invention as defined by the appended claims.

Figure 1:
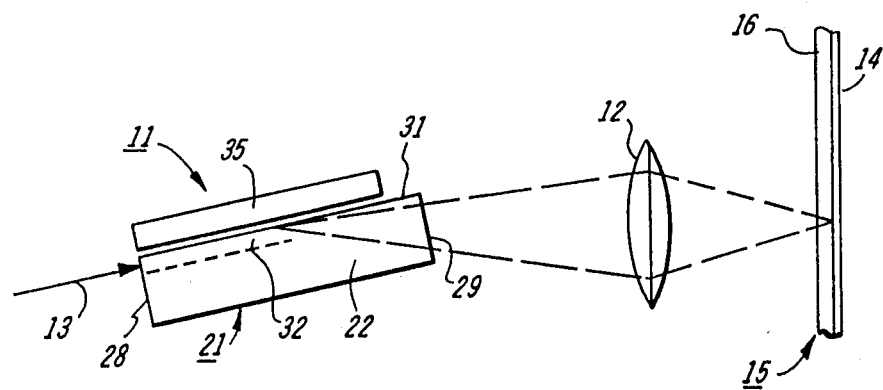
FIG. 1 is a partial schematic diagram of an optical disk memory having an electro-optic focus control device constructed in accordance with the present invention.

Turning now to the drawings, and at this point especially to FIG. 1, there is an optical data storage system 11 (shown only in relevant part) having a lens 12 for focusing a light beam 13 onto the optically sensitive recording layer 14 of an optical recording medium 15. As shown, the storage system 11 is an optical disk memory, and the recording medium 15 has a transparent glass or plastic substrate 16 for supporting the optically sensitive layer 14.

In accordance with the present invention, there is a variable length electro-optic waveguide 21 for adjusting the apparent distance between the source of the light beam 13 and the lens 12 (i.e., the object-to-lens distance), thereby controlling the longitudinal or axial position at which the light beam 13 is brought to focus (i.e., the lens-to-image distance) in accordance with the well known lens formula:

$$1/f = 1/I + 1/O \qquad (1)$$

where:
 f = the focal length of the lens 12;
 I = the object-to-lens distance; and
 O = the lens-to-image distance.

Should the distance between the lens 12 and the recording layer 14 vary, the effective length of the waveguide 21 is changed to adjust the input conjugate of the lens 12 (i.e., the object-to-lens distance), thereby increasing or decreasing the output conjugate of the lens 12 (i.e., the lens-to-image distance) as may be required to maintain the light beam 13 in reasonably sharp focus on the recording layer 14.

Figure 2:
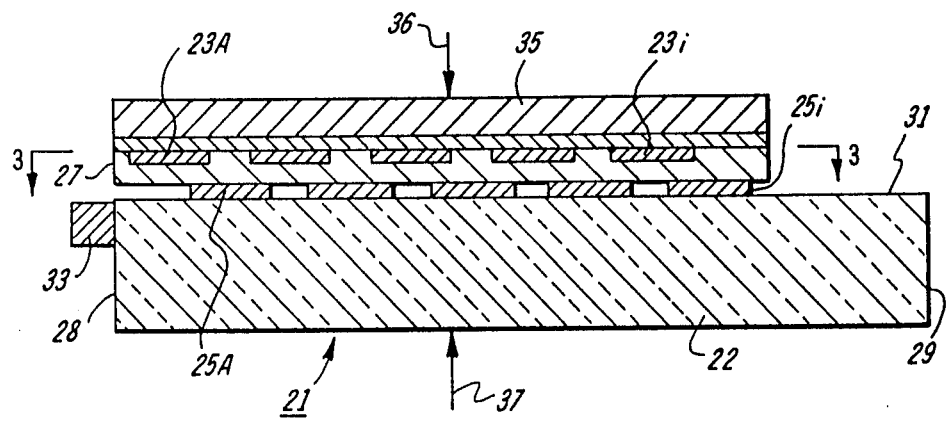
FIG. 2 is an enlarged longitudinal sectional view of the focus control device shown in FIG. 1.
Figure 3:
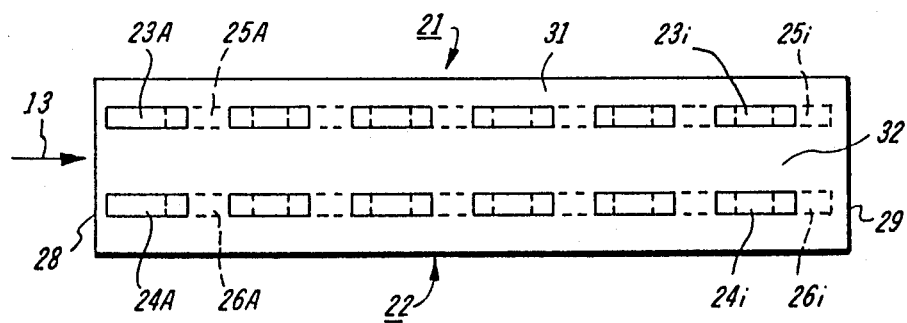
FIG. 3 is an enlarged layout view of the electrodes for the focus control device of FIG. 1 as viewed looking in the direction of the arrows 3—3 in FIG. 2.

Referring to FIGS. 2 and 3, to carry out this invention, the waveguide 21 comprises an optically transparent electro-optic element 22 and two or more layers of longitudinally segmented and laterally separated electrode sets $23a-23i$, $24a-24i$ and $25a-25i$, $26a-26i$, respectively, which are electrically insulated from one another by an intermediate dielectric coating 27. The most promising electro-optic materials for such a device presently appear to be LiNbO$_3$ and LiTaO$_3$, but there are others which warrant consideration, including BSN, KDP, KD$^x$P, Ba$_2$NaNb$_5$O$_{15}$ and PLZT. In this particular embodiment, the electro-optic element 22 is a y-cut crystal of, say, LiNbO$_3$ which has optically polished input and output faces 28 and 29, respectively, and an optically polished longitudinal surface 31 extending therebetween.

The light beam 13 is coupled into the electro-optic element 22 to be guided along a shallow waveguide channel 32 (FIGS. 1 and 3) adjacent the surface 31. As shown in FIG. 2, the light beam 13 may be supplied by a diode laser 33 which is butt coupled to the input face 28 of the electro-optic element 22 near the level of the waveguiding channel 32. Alternatively, a grating or prism-type coupler (not shown) may be used to couple a light beam from a remote source (also not shown) into the waveguide channel 32. In any event, the waveguide 32 guides the input light beam as described hereinbelow.

To create the waveguiding region or channel 32, electric fringe fields are coupled into the electro-optic element 22 through its longitudinal surface 31, thereby locally increasing its refractive index. The depth of the channel 32 is dependent on the depth to which such fields penetrate into the electro-optic element 22. Accordingly, the first layer of electrodes 23a-23i and 24a-24i, the second layer of electrodes 25a-25i and 26a-26i, and the intermediate dielectric coating 27 are stacked on or very near the longitudinal surface 31 of the electro-optic element 22.

Indeed, as shown, the electrodes 23a-23i, 24a-24i, 25a-25i, and 26a-26i and the intermediate dielectric coating 27 preferably are supported in layered relationship on a suitable substrate, such as a VLSI silicon circuit 35, which is pressed or otherwise firmly held against the surface 31, as indicated by the arrows 36 and 37, so that the outermost or second layer of electrodes 25a-25i and 26a-26i is held in contact with or closely adjacent the surface 31. Under those circumstances, the fringe fields are "proximity coupled" into the electro-optic element 22. As will be appreciated, the advantage of such a construction is that the VLSI circuit 35 may be used to make the necessary electrical connections to the segmented electrodes 23a-23i, 24a-24i, 25a-25i and 26a-26i. See, a copending and commonly assigned United States patent application of R. A. Sprague et al., on "Integrated Electronics for Proximity Coupled Electro-Optic Devices," which was filed Sept. 17, 1980 under Ser. No. 188,171, (U.S. Pat. No. 4,367,925, issued Jan. 11, 1983) and another copending and commonly assigned United States patent application of R. A. Sprague et al., on "Multilayer Interleaved Electrodes for Mulitgate Light Valves," which was filed Mar. 30, 1981 under Ser. No. 248,939 U.S. Pat. No. 4,415,915, issued Nov. 15, 1983. Alternatively, however, it is conceivable that the first layer of electrodes 23a-23i and 24a-24i, the second layer of electrodes 25a-25i and 26a-26i, and the intermediate dielectric coating 27 could be deposited in layers directly on the longitudinal surface 31 of the electro-optic element 22.

In keeping with this invention, the electrodes 23a-23i and 25a-25i are longitudinally segmented and are spaced apart widthwise or laterally of the electro-optic element 22 so that the waveguiding channel 32 has a predetermined width. Each of the electrode segments 23a-23i is directly across from and paired with a respective one of the electrod signals 24a-24i so that an electric fringe field is created whenever a voltage is applied across any such pair, such as the segments 23a and 24a. Likewise, the electrodes 25a-25i and 26a-26i are longitudinally segmented and laterally displaced from one another in paired relationship. Furthermore, the electrode segments 25a-25i and 26a-26i are longitudinally interleaved with and overlap the segments 23a-23i and 24a-24i, respectively, so that there are no significant discontinuities along the length of the waveguiding channel 32.

In operation, all electrode segment pairs up to a preselected point along the length of the electro-optic element 22 are excited (i.e., have appropriate drive voltages applied thereacross), while all segment pairs beyond that point are maintained in an unexcited or quiescent state. Accordingly, the length of the waveguiding channel 32 is dependent on the number of sucessive electrode segment pairs that are excited at any given time. That is, the waveguide 32 extends essentially from the input face 28 of the electro-optic element 22 to a point just beyond the last of the excited segment pairs and can be lengthened or shortened by exciting additional or fewer segment pairs. To simpify the electronics required to adjust the length of the waveguiding channel 32, the electrode segments 23a-23i and 25a-25i are individually addressable, while the other electrode segments 24a-24i and 26a-26i are maintained (by means not shown) at a common reference potential, such as ground.

Light exiting from the waveguiding channel 32 diverges from an apparent light source at the exit point with a cone angle that is dependent on the mode or modes of the light beam 13 that are guided by the channel 32. The electro-optic element 22 is positioned substantially in the object plane of the focusing lens 12 and is obliquely tilted relative to the recording medium 15 by an angle equal to approximately one-half the aforementioned cone angle so that the lens 12 images the apparent light source onto the sensitive layer 14 of the recording medium 15. Due to the tilt of the electro-optic element 22, any variation in the length of the waveguide 32 is accompanied by a slight "on track" shift in the position of the image formed by the lens 12. Inasmuch as this minor positional error is along the selected data track, it causes no problem in systems for writing and reading self clocking data (i.e., self clocking systems) and can be directly compensated for in non-self clocking systems.

Figure 4:
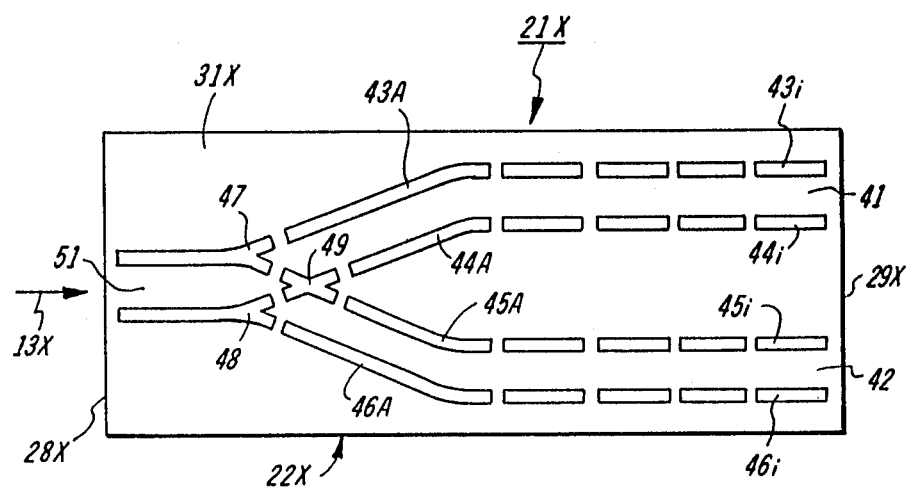
FIG. 4 is an electrode layout diagram for a relatively simple branching waveguide which may be used to perform focus and tracking control in accordance with this invention.

Referring to FIGS. 4 and 5, it will be evident that the present invention may also be applied to provide integrated focusing and tracking for optical memories. Like reference numerals have been used to indentify the like components of this and the above described embodiment to avoid unnecessary repetition, and the suffix "x" has been appended to such reference numerals to prevent confusion.

To carry out the tracking function, provision is made for steering the input light beam 13x into a preselected one of a plurality of laterally branching, variable length waveguiding channels 41 and 42. Each of the waveguiding channels 41 and 42 is dependent on fringe fields radiating from a pair of laterally separated and longitudinally semented electrodes 43a-43i and 44a-44i, on the one hand, and 45a-45i and 46a-46i, on the other. As shown, the segmented electrodes 43a-43i, 44a-44i, 45a–45i and 46a–46i are coplanar, but it will be understood that the above-described multilayer segmented electrode construction could be utilized. To accomodate the coplanar relationship of the elctrodes 43a–43i, 44a–44i, 45a–45i and 46a–46, the junction between the 5 waveguiding channels 41 and 42 is defined by Y-shaped steering electrodes 47 and 48 and by a X-shaped crossover electrode 49. If desired, however, a multilayer electrode construction may be employed to provide a relatively continous junction as described in more detail in a copending and commonly assigned United States patent application of W. D. Turner et al., which was filed May 10, 1982 under Ser. No. 376,979 on "Branching Electro-Optic Waveguides."

In any event, fields radiating from the input or steering electrodes 47 and 48 create a waveguiding channel 51 for guiding the light beam 13x to the junction between the waveguiding channels 41 and 42. At that point and with the help of the crossover electrode 49, the light beam 13x is steered into the channel 41 or the channel 42, depending on which pair of electrodes 43a–43i and 44a–44i or 45a–45i and 46a–46i are being actively driven. As will be appreciated, the segmentation of the electrodes 43a–43i, 44a–44i, 45a–45i and 46a–46i enables the length of the waveguiding channels 41 and 42 to be adjusted as required for focus control.

While only a single junction branching waveguide has been shown, it will be evident that branching junctions may be cascaded and otherwise combined to provide multiple junction waveguides having almost any practical configuration.

CONCLUSION

In view of the foregoing, it will be understood that the present invention provides variable length electro-optical waveguides which are especially well suited for focus control in optical data storage systems and the like. Furthermore, it will be appreciated that invention may be applied to branching electro-optic waveguides to integrate, for example, the focus and tracking control functions in such systems.

What is claimed is:

1. A variable length waveguide for guiding light in a generally longitudinal direction, said waveguide comprising
   an electro-optic element; and
   a pair of laterally spaced electrodes proximate a longitudinal surface of said electro-optic element; at least one of said electrodes being defined by a plurality of individually addressable electrode segments which are layered in longitudinally interleaved and overlapping relationship with one another.

2. The waveguide of claim 1 wherein
   said waveguide includes a plurality of laterally displaced electrodes with individually addressable segments,
   whereby a plurality of laterally displaced waveguiding channels of controllable length may be selectively created in said electro-optic element.

3. The waveguide of claim 1 further including
   an integrated circuit for supporting said electrodes and for selectively addressing said individually addressable electrode segments, said integrated circuit being intimately associated with said electro-optic element for proximity coupling electric fringe fields into said electro-optic element from said excited electrodes, thereby creating said waveguiding channel.

4. The waveguide of claim 3 wherein each layer of electrodes includes
   a plurality of laterally displaced electrodes with individually addressable segments, and
   at least one segmented reference plane electrode for each pair of segmented individually addressable electrodes,
   whereby electric fringe fields may be coupled into said electro-optic element from any of said segmented individually addressable electrodes, thereby selectively creating a plurality of laterally displaced waveguiding channels of controllable length in said electro-optic element.

5. In an optical memory having a source for supplying a light beam, and a lens for focusing said light beam on an optical recording medium; the improvement comprising an electro-optic focus control device optically aligned between said source and said lens for enabling said lens to maintain said light beam in focus on said recording medium; said focus control device including
   an electro-optic element, and
   at least two layers of longitudinally segmented electrodes proximate a longitudinal surface of said electro-optic element; each of said layers including at least two laterally displaced electrodes, one having individually addressable segments and the other having its segments maintained at a predetermined reference potential; the segmented electrodes within different ones of said layers being longitudinally interleaved with each another in overlapping relationship;
   whereby a waveguiding channel of controllable length is created in said electro-optic element for guiding said light beam when longitudinally adjacent ones of said individually addressable electrode segments are simultaneously excited, thereby causing said light beam to diverge from an apparent point source at a longitudinally controllable position along said electro-optic element for focusing by said lens.

6. The improvement of claim 5 wherein
   said light beam diverges from said point source with a predetermined cone angle, and
   said electro-optic element is obliquely tilted relative to said recording medium by approximately one half said cone angle, whereby said lens images said point source onto said recording medium.

7. The improvement of claim 6 wherein said focus control device further includes
   an integrated circuit for supporting said layers of electrodes and for selectively addressing said individually addressable electrode segments, said integrated circuit being intimately associated with said electro-optic element for proximity coupling electric fringe fields into said electro-optic element from said excited electrodes, thereby creating said waveguiding channel.

8. The improvement of claim 5 wherein each layer of electrodes includes
   a plurality of laterally displaced electrodes with individually addressable segments, and
   at least one segmented reference plane electrode for each pair of segmented individually addressable electrodes,
   whereby electric fringe fields may be coupled into said electro-optic element form longitudinally adjacent ones of said individually addressable electrode segments to selectively creat a plurality of laterally displaced waveguiding channels of controllable length in said electro-optic element, thereby causing said light beam to diverge from an apparent point source at a longitudinally and laterally controllable position along said electro to provide focus and tracking control for said memory.

9. The improvement of claim 8 wherein
said light beam diverges from said point source with a predetermined cone angle, and
said electro-optic element is obliquely tilted relative to said recording medium by approximately one half said cone angle, whereby said lens images said point source onto said recording medium.

10. The improvement of claim 9 further including
an integrated circuit for supporting said layers of electrodes and for selectively addressing said individually addressable electrode segments, said integrated circuit being intimately associated with said electro-optical element for proximity coupling electric fringe fields into said electro-optic element from said excited electrodes, thereby selectively creating said waveguiding channels.

11. A tracking control device for optical memories, said device comprising
an electro-optic element;
at least two laterally branching pairs of laterally separated electrodes proximate said electro-optic element for selectively creating laterally displaced waveguiding channels therein, said branching electrode pairs branching out from one another at a junction; and
steering electrodes at said junction for steering a light beam into a selected one of said waveguiding channels.

12. The tracking control device of claim 11 wherein
at least one of the electrodes of each of said pairs is defined by individually addressable electrode segments, whereby the lengths of said waveguiding channels may be adjusted as required for focus control.

* * * * *